(12) United States Patent
Fair

(10) Patent No.: US 9,163,773 B2
(45) Date of Patent: Oct. 20, 2015

(54) INSULATION FOR A CRYOGENIC COMPONENT

(75) Inventor: Ruben Fair, Niskayuna, NY (US)

(73) Assignee: GE ENERGY POWER CONVERSION TECHNOLOGY, LTD. (GB)

( * ) Notice: Subject to any disclaimer, the term of this patent is extended or adjusted under 35 U.S.C. 154(b) by 217 days.

(21) Appl. No.: 13/990,071

(22) PCT Filed: Nov. 24, 2011

(86) PCT No.: PCT/EP2011/070918
§ 371 (c)(1),
(2), (4) Date: Jul. 10, 2013

(87) PCT Pub. No.: WO2012/072481
PCT Pub. Date: Jun. 7, 2012

(65) Prior Publication Data
US 2014/0057068 A1    Feb. 27, 2014

(30) Foreign Application Priority Data
Nov. 30, 2010 (EP) .................... 10015124

(51) Int. Cl.
*F17C 13/00* (2006.01)
*F16L 59/14* (2006.01)
*F16L 59/02* (2006.01)
*H01B 12/14* (2006.01)
*H02K 55/00* (2006.01)

(52) U.S. Cl.
CPC ............. *F16L 59/141* (2013.01); *F16L 59/029* (2013.01); *H01B 12/14* (2013.01); *H02K 55/00* (2013.01); *Y02E 40/62* (2013.01); *Y10T 29/49826* (2015.01); *Y10T 428/24008* (2015.01); *Y10T 428/2481* (2015.01); *Y10T 442/10* (2015.04)

(58) Field of Classification Search
CPC .... F17C 13/001; F16L 59/029; F16L 59/141; Y10T 428/24008
USPC .......................... 428/99; 442/6; 138/148, 147
See application file for complete search history.

(56) References Cited

U.S. PATENT DOCUMENTS

| | | | |
|---|---|---|---|
| 3,869,686 A | 3/1975 | Benz | |
| 4,104,783 A | 8/1978 | Schultz et al. | |
| 4,161,966 A * | 7/1979 | Scheffler et al. | 138/112 |
| 4,230,057 A | 10/1980 | Kurz | |
| 7,252,890 B1 | 8/2007 | Wong | |
| 2003/0106325 A1 | 6/2003 | Robbie | |
| 2004/0025520 A1 * | 2/2004 | Robbie | 62/50.7 |
| 2004/0256395 A1 | 12/2004 | Lak et al. | |
| 2009/0223584 A1 * | 9/2009 | Gray | 138/109 |

FOREIGN PATENT DOCUMENTS

| | | |
|---|---|---|
| CN | 2314454 Y | 4/1999 |
| FR | 2594747 A1 | 8/1987 |
| GB | 1316173 A | 5/1973 |

* cited by examiner

*Primary Examiner* — Alexander Thomas
(74) *Attorney, Agent, or Firm* — Parks Wood LLC

(57) ABSTRACT

Insulation for a cryogenic component is described. The insulation includes an inner portion formed of a multi-layer insulating material comprising alternating layers of metalized polymer film and polymer netting. An outer supporting mesh surrounds the inner portion and is formed of stainless steel. The insulation is particularly suitable for insulating cryogenic components that move during operation since the supporting mesh acts to support the inner portion against damage caused by forces resulting from motion of the cryogenic component.

13 Claims, 1 Drawing Sheet

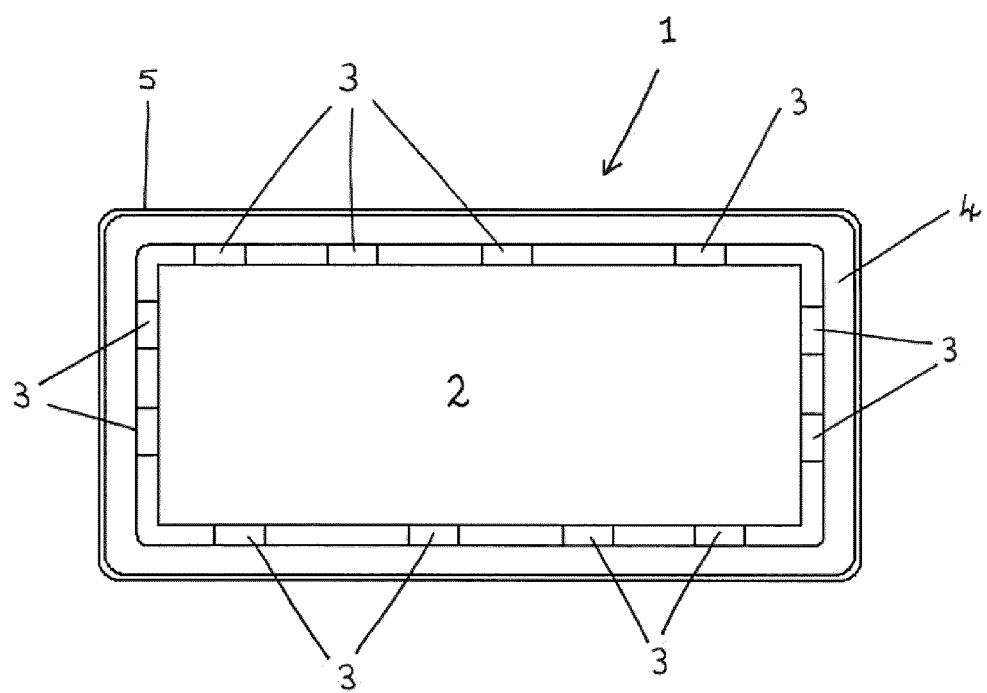

INSULATION FOR A CRYOGENIC COMPONENT

FIELD OF THE INVENTION

The present invention relates to the insulation of cryogenically cold components.

BACKGROUND OF THE INVENTION

In some machines, components are required to be maintained in a cryogenically cold temperature range in order to operate properly. For example, superconducting components of superconducting electrical machines are required to be maintained at a temperature where they exhibit superconductivity. In order to maintain a component in a cryogenic temperature range it is necessary to both cool the component and to insulate the component from adjacent components that are not maintained in the same temperature range. Even if a cryogenic component is contained within a vacuum chamber, in order to minimise heating of the component, it is generally necessary to further insulate the component in order to prevent radiation heat loads warming the component.

Conventionally, cryogenic components are insulated by wrapping the component in multi-layer insulation. This insulation is made of alternating thin sheets of aluminised biaxially-oriented polyethylene terephthalate (e.g. Mylar®, as manufactured by Dupont Teijin Films U.S. of Wilmington, Del.) and polyester net. Multi-layer insulation is necessarily very light and delicate.

For many static cryogenic components it is sufficient for the multi-layer insulation to be wrapped around the component and held in position with cryogenic tape. However, for cryogenic components that are not static but move during operation then the multi-layer insulation can fatigue during operation of the component and can even tear or delaminate. This can result in a severe reduction in the insulating efficiency of the multi-layer insulation. This effect is particularly pronounced for cryogenic components that rotate during operation and which are subject to large centripetal forces. An example of such cryogenic components would be those found in high-speed superconducting rotating electrical machines.

In light of the above, there is a need for improved insulation for cryogenic components that provides improved resistance to forces resulting from motion of the cryogenic component during operation. In particular, there is a need for improved insulation for the cryogenic components of high-speed superconducting rotating electrical machines.

SUMMARY OF THE INVENTION

The present invention provides insulation for a cryogenic component comprising: an inner portion formed of a multi-layer insulating material comprising alternating layers of metalized polymer film and polymer netting; and an outer supporting mesh formed of stainless steel substantially surrounding the inner portion.

The insulation of the present invention is advantageous over insulation according to the prior art in that it additionally comprises an outer supporting mesh that acts to protect the inner portion of multi-layer insulating material against forces resulting from the motion of the cryogenic component.

The insulating material of the present invention is a multi-layer insulating material. Multi-layer insulating materials are generally preferable as they can provide much better insulation than insulation formed of a single layer. The multi-layer material, comprises alternating layers of metalized polymer film and polymer netting. The layers may be formed of any suitable metalized polymer film and any suitable polymer netting. However, it may be preferable that the metalized polymer film is aluminised biaxially-oriented polyethylene terephthalate (e.g. Mylar® as manufactured by Dupont Teijin Films U.S. of Wilmington, Del.) and it may be preferable that the polymer netting is polyester net. It will be readily appreciated that one or both of these materials may be replaced with any substantially equivalent material that is known to the person skilled in the art.

The supporting mesh of the present invention is formed of stainless steel because of its relatively high strength, excellent corrosion resistance, and suitability for use at cryogenic temperatures and in a high vacuum. Substantially conventional stainless steel mesh, such as that used in the construction of vehicle silencers or fencing for small mammals, may be used in insulation according to the present invention. However, it may be preferable to use specifically manufactured stainless steel mesh that is specifically designed and intended for use in the present invention.

Advantageously, the insulation of the present invention may further comprise adhesive tape for holding the inner portion in position around the cryogenic component. The adhesive tape may be applied to the inner portion after it has been positioned around the cryogenic component and before the outer supporting mesh is wrapped around the inner portion. The adhesive tape can be any tape that is suitable for use at cryogenic temperatures and in a high vacuum. In a preferred embodiment of the present invention the adhesive tape may comprise aluminised biaxially-oriented polyethylene terephthalate tape.

The insulation may further comprise a plurality of spacers, preferably formed of bands of low thermal conductivity material, for spacing the inner portion from the surface of the cryogenic component. Spacers can act to hold the inner portion of insulating material away from the surface of the cryogenic component. As will be readily understood by the person skilled in the art, the use of spacers may be preferable to the insulating material being wrapped directly around the cryogenic component as it can provide improved insulation of the cryogenic component.

If the insulation of the present invention comprises spacers they may be formed of any material that is suitable for use at cryogenic temperatures and in a high vacuum. Advantageously, the spacers may be formed of glass reinforced plastic (GRP) or carbon reinforced plastic (CRP).

When in use, the supporting mesh of the present invention may be held in position around the inner portion using any means or method apparent to the person skilled in the art. Generally, insulation according to the present invention may be positioned around a cryogenic component by first positioning any spacers that may form part of the invention. The inner portion may then be laid over the spacers, closed off and held in position using adhesive tape or any other suitable means. Finally, the supporting mesh may be loosely wrapped around the inner portion and secured in position in a suitable manner. Preferably, compression of the inner portion by the wrapping of the supporting mesh around the inner portion will be minimised by wrapping the supporting mesh at the minimum tension that is required for it to be held in position. Excessive compression of the inner portion is undesirable as it can reduce the insulating properties of the inner portion. Utilising spacers can help minimise compression of the inner portion as it may ensure that any compression of the inner portion is localised at the sections of the inner portion that are directly supported by the spacers.

In a preferred embodiment of the invention the insulation further comprises wire ties for holding the supporting mesh around the inner portion. The wire ties can be used to tie the wire mesh in position in a manner that will be immediately apparent to the person skilled in the art. Preferably, the wire ties may be formed of stainless steel. However, it is to be understood that the wire ties can be formed of any suitable material.

The present invention also provides a method of insulating a cryogenic component comprising the steps of: surrounding the cryogenic component with an inner portion formed of a multi-layer insulating material comprising alternating layers of metalized polymer film and polymer netting; and wrapping the inner portion in a supporting mesh formed of stainless steel.

The method of the invention is advantageous as wrapping the inner portion in a supporting mesh acts to protect the inner portion of the insulating material against forces resulting from the motion of the cryogenic component.

Advantageously, the method of the present invention further comprises the step of over-binding the cryogenic component with spacers formed of low thermal conductivity before surrounding the cryogenic component with the inner portion.

When insulating a cryogenic component using the method of the present invention the inner portion may be held in position in any suitable manner apparent to the person skilled in the art. However, it may be preferable that the inner portion is held in position with adhesive tape. The supporting mesh may be held in position in any suitable manner apparent to the person skilled in the art. However, it may be preferable that the supporting mesh is held in position using at least one wire tie.

The method of the present invention may substantially comprise the step of insulating a cryogenic component with insulation according to the present invention. In particular, all of features and materials of the insulation as described above are applicable to the method of the present invention. For example, the inner portion may preferably be formed of multi-layer insulation formed of alternating layers of aluminised biaxially-oriented polyethylene terephthalate and polyester net, and any spacers may preferably be formed of carbon reinforced plastic or glass reinforced plastic.

The insulation may be positioned around any suitable cryogenic component, which might include any component that is positioned within a vacuum chamber or cryostat (e.g. a structural mounting) or part of the cryostat itself.

Further details and advantages of the present invention will be apparent from the details of the preferred embodiment that is shown in the drawing and is discussed below.

BRIEF DESCRIPTION OF THE DRAWINGS

EXEMPLARY EMBODIMENTS OF THE INVENTION WILL NOW BE DESCRIBED, WITH REFERENCE TO THE ACCOMPANYING DRAWINGS, IN WHICH:

FIG. 1 is a schematic cross-section of a cryogenic component that is insulated by insulation according to a preferred embodiment of the present invention.

Insulation 1 according to a preferred embodiment of the invention is shown in FIG. 1. The insulation 1 is shown located around a cryogenic component 2. It is to be understood that FIG. 1 is a schematic drawing and, as such, the relative thicknesses of the different layers of the insulation 1 are not depicted accurately.

DETAILED DESCRIPTION OF THE PREFERRED EMBODIMENTS

The insulation 1 comprises a plurality of spacers 3, an inner portion 4 formed of multi-layer insulation and a supporting mesh 5. The spacers 2 are bands of glass reinforced plastic (GRP). The inner portion 4 is formed of conventional multi-layer insulation comprising alternating layers of aluminised biaxially-oriented polyethylene terephthalate and polyester net. The supporting mesh 5 is formed of stainless steel.

The insulation 1 is wrapped around the cryogenic component 2 in the following manner.

First, the cryogenic component 2 is over-bound with the spacers 3. The spacers 3 are located at suitable positions for supporting the inner portion 4 of the insulation 1. In particular, the spacers 3 are substantially parallel to one another and are located at substantially regular intervals around the outer surface of the cryogenic component.

The inner portion 4 of the insulation is then laid over the spacers, closed off and held in place using aluminised biaxially-oriented polyethylene terephthalate tape (not shown) in a conventional manner.

Finally, the supporting mesh 5 is loosely wrapped around the inner portion 4 and tied in position using short lengths of stainless steel (not shown).

The tension at which the supporting mesh 5 is wrapped around the inner portion 4 is important. If the supporting mesh 5 is wrapped too tightly it will unduly compress the inner portion 4 and thereby reduce the amount of thermal insulation provided by the insulation 1. However, if the supporting mesh 5 is wrapped too loosely it will not provide adequate support to the inner portion 4 against forces generated by movement (e.g. rotation) of the cryogenic component.

The hole size of the supporting mesh 5 is also an important consideration. The hole size must be large enough to ensure that undue compression is not applied to the inner portion. However, the hole size must not be so large such that the supporting mesh 5 provides inadequate support to the inner portion 4. The appropriate hole size of the supporting mesh 5 will be dependent upon the cryogenic component 2 that is insulated and the conditions at which that cryogenic component operates. The appropriate hole size of the supporting mesh 5 should be able to be easily determined by a person skilled in the art.

The invention claimed is:

1. A cryogenic component of a rotating electrical machine and an insulation therefor, the insulation comprising:
    an inner portion spaced a predetermined distance apart from the outer surface of the cryogenic component and formed of a multi-layer insulating material comprising alternating layers of metalized polymer film and polymer netting, the cryogenic component being a movable part of the rotating electrical machine; and
    an outer supporting mesh formed of stainless steel loosely wrapped around the inner portion and configured to support the inner portion against forces from the movement of the cryogenic component.

2. Insulation according to claim 1, wherein the multi-layer insulating material comprises alternating layers of aluminised biaxially-oriented polyethylene terephthalate and polyester net.

3. Insulation of claim 1, further comprising adhesive tape for holding the inner portion in position around the cryogenic component.

4. Insulation of claim 3, wherein the adhesive tape is aluminised biaxially-oriented polyethylene terephthalate tape.

5. Insulation of claim 1, further comprising a plurality of spacers formed of bands of low thermal conductivity material for spacing the inner portion the predetermined distance apart from the surface of the cryogenic component.

6. Insulation of claim 5, wherein the spacers are formed of glass reinforced plastic.

7. Insulation of claim 5, wherein the spacers are formed of carbon reinforced plastic.

8. Insulation of claim 1, further comprising wire ties for holding the supporting mesh around the portion.

9. Insulation of claim 8, wherein the wire ties are formed of stainless steel.

10. A method of insulating a cryogenic component of a rotating electrical machine, comprising:

surrounding the cryogenic component with an inner portion formed of a multi-layer insulating material comprising alternating layers of metalized polymer film and polymer netting, the inner portion being spaced a predetermined distance apart from the outer surface of the cryogenic component, and the cryogenic component being a movable part of the rotating electrical machine; and loosely wrapping the inner portion in a supporting mesh formed of stainless steel for supporting the inner portion against forces from the movement of the cryogenic component.

11. The method of claim 10, further comprising over-binding the cryogenic component with spacers formed of bands of low thermal conductivity material to space the inner portion the predetermined distance apart from the outer surface of the cryogenic component, before surrounding the cryogenic component with the inner portion.

12. The method of either claim 10, wherein the inner portion is held in position with an adhesive tape.

13. The method of claim 10, wherein the supporting mesh is held in position using at least one wire tie.

* * * * *